(12) United States Patent
Tsai et al.

(10) Patent No.: US 6,612,043 B2
(45) Date of Patent: Sep. 2, 2003

(54) METHOD AND APPARATUS FOR VERTICALLY CALIBRATING WIRE OF WIRE CUTTING ELECTRIC DISCHARGE MACHINE

(75) Inventors: Chen-Fu Tsai, Hsinchu (TW); Jui-Fang Liang, Changhua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/876,117

(22) Filed: Jun. 8, 2001

(65) Prior Publication Data

US 2002/0184777 A1 Dec. 12, 2002

(51) Int. Cl.$^7$ .................................................. G01B 7/00
(52) U.S. Cl. ....................................... 33/502; 219/69.12
(58) Field of Search ................................ 33/502, 1 BB, 33/626, 627, 628, 655, 661, 533; 219/69.12

(56) References Cited

U.S. PATENT DOCUMENTS

| | | | | |
|---|---|---|---|---|
| 4,364,812 A | * | 12/1982 | Inoue | 204/224 M |
| 4,736,086 A | * | 4/1988 | Obara | 219/69.12 |
| 4,829,151 A | * | 5/1989 | Buchler | 219/69.12 |
| 5,006,691 A | * | 4/1991 | Nakayama | 219/69.12 |
| 5,064,983 A | * | 11/1991 | Yokomichi et al. | 219/69.12 |
| 5,134,781 A | * | 8/1992 | Baker | 33/502 |
| 5,257,460 A | * | 11/1993 | McMurtry | 33/502 |
| 5,309,646 A | * | 5/1994 | Randolph et al. | 33/502 |
| 5,329,703 A | * | 7/1994 | Craig | 33/502 |
| 5,451,737 A | * | 9/1995 | Bertholds et al. | 219/69.12 |
| 5,744,775 A | * | 4/1998 | Yasuda et al. | 219/69.12 |
| 5,922,220 A | * | 7/1999 | Beltrami et al. | 219/69.12 |
| 6,306,126 B1 | * | 10/2001 | Moctezuma | 606/1 |

* cited by examiner

*Primary Examiner*—Diego Gutierrez
*Assistant Examiner*—Amy R. Cohen
(74) *Attorney, Agent, or Firm*—Shoemaker and Mattare

(57) ABSTRACT

A method and an apparatus for vertically calibrating a wire of a wire cutting electric discharge machine are provided. The vertical calibration apparatus includes a body, an upper calibration board and a lower calibration board attached to the body and parallel to a machine table, with a circular hole formed through the upper calibration board and on the lower calibration board respectively. The two circular holes are coaxial and have different diameters. The method of wire vertical calibration includes searching for the circle centers of the two circular holes by contacting the circles several times with the wire in a prescribed manner, then passing the wire through the circle centers. The method and apparatus allow wire vertical calibration to be more easily and accurately performed.

9 Claims, 8 Drawing Sheets

(a)

(b)

METHOD AND APPARATUS FOR VERTICALLY CALIBRATING WIRE OF WIRE CUTTING ELECTRIC DISCHARGE MACHINE

FIELD OF THE INVENTION

The present invention relates to wire cutting electric discharge machines, and especially to a method and apparatus for vertically calibrating a wire of a wire cutting electric discharge machine and measuring heights of an upper holding guide and a lower holding guide.

BACKGROUND OF THE INVENTION

A conventional device for vertically calibrating a wire of a cutting electric discharge machine is illustrated in FIG. 1. This vertical calibration device 1 has an upper calibration board 2 with a surface PX1 being coplanar with a surface PX2 of a lower calibration board 3, while a surface PY1 of the upper calibration board 2 is coplanar with a surface PY2 of the lower calibration board 3. The upper calibration board 2 and lower calibration board 3 are insulatively fixed to a main body 7. The surfaces PX1 and PX2 are respectively perpendicular to the surfaces PY1 and PY2, and these surfaces are all perpendicular to the bottom of the main body 7 and a horizontal base table (not shown). For performing vertical calibration, it is necessary to install the vertical calibration device 1 on the base table to make the surfaces PX1 and the surface PX2 parallel to the X axis, while making the surfaces PY1 and PY2 parallel to a Y axis. A driving machine (not shown) is used to drive a (copper) wire under tension. Contact points on the surfaces PX1 and PX2 are first derived in X and U directions at the same time, and then contact points on the surfaces PY1 and PY2 are acquired in Y and V directions. Thereby, the position of a vertical line is obtained.

A method for measuring heights of an upper holding guide and a lower holding guide of a wire cutting electric discharge machine through the use of the conventional vertical calibration device 1 is illustrated in FIG. 2. As shown in FIG. 2, a wire 4 is disposed at a position corresponding to the above-obtained vertical line. To obtain a distance x from a base table (not shown) to the upper holding guide 5 and a distance y from the base table to the lower holding guide 6, at first, the upper holding guide 5 is displaced away from the position of the vertical calibration device 1 along the X and U directions by a distance e, indicated by a tilt wire 4' shown in FIG. 2. Then, the upper holding guide 5 and lower holding guide 6 move with a constant speed toward the vertical calibration device 1 to allow this tilt wire 4' to move for a distance d and reach the position of a tilt wire 4' in contact with the lower calibration board 3 of the vertical calibration device 1. After the upper holding guide 5, and lower holding guide 6, and wire 4 return to the vertical position, the above procedures are repeated to move the lower holding guide 6 away from the vertical calibration device 1 by a distance and use a tilt wire to find a contact point with the upper holding guide 2 of the vertical calibration device 1, as indicated by a tilt wire 4'" shown in FIG. 2, by which a distance c of movement is obtained. From the triangular relation of FIG. 2, we may derive:

$$X = [a(c-e) + b(e-d)]/(c-d) \quad (1)$$

$$Y = (bd - ac)/(c-d), \quad (2)$$

where a, b, and c are known, and c and d are respectively the distances by which the tilt wires shift to contact the upper calibration board 2 and the lower calibration board 3. Thereby, the distances x and y, respectively, from the upper holding guide 5 to the base table and from the lower holding guide 6 to the table are obtained.

However, the above conventional device and method for vertically calibrating a wire of a wire cutting electric discharge machine have the following disadvantages.

The vertical calibration device 1 is required to be mounted parallel to the base table, or otherwise multiple calibrations in the X and Y directions for converging to a vertical position must be performed. However, the parallel arrangement with the table for the calibration device is difficult to implement, and inaccuracy of the vertical position would adversely affect the determination of positions of the upper holding guide and lower holding guide.

When estimating the positions of the upper holding guide 5 and lower holding guide 6, equations (1) and (2) include two variables c and d which are difficult to measure and may enlarge the errors in calculating x and y. To overcome the problems mentioned above, a method and apparatus for a circular type of vertical calibration have developed.

SUMMARY OF THE INVENTION

Accordingly, the primary object of the present invention is to provide an apparatus and a method for vertically calibrating a wire of a wire cutting electric discharge machine, wherein upper and lower coaxial circles of different diameters are used for parallel arrangement of the apparatus with a base table, so as to increase speed and accuracy of measurement performed by the apparatus and method Another object of the present invention is to provide an apparatus and a method for vertically calibrating a wire of a wire cutting electric discharge machine, wherein upper and lower coaxial circles of different diameters are used, whose cone angle is used for calculation of heights of an upper holding guide and a lower holding guide.

A further object of the present invention is to provide an apparatus and a method for vertically calibrating a wire of a wire cutting electric discharge machine, wherein contact between a copper wire and a calibrator is reduced to prevent damage to the copper wire, so as not to affect the accuracy in calibration.

To achieve above objects, the present invention provides an apparatus for vertically calibrating a wire of a wire cutting electric discharge machine, which includes: a main body having a flat bottom, and an upper calibration board and a lower calibration board insulated from and connected to one lateral surface of the main body. The upper calibration board is formed with an upper circle and the lower calibration board is formed with a lower circle, wherein the upper circle and lower circle have different diameters but are coaxial. The vertical calibration apparatus of the present invention is coordinated with a machine controller to detect whether the wire is in contact with the circles. First, the calibration device is mounted on a base table. Since the upper circle and lower circle are coaxial circles, it is unnecessary to consider the direction of the apparatus. The wire, under tension, passes through the circles, and then, the wire is moved to contact the upper circle and lower circle to determine the centers of the upper circle and lower circles and therefore the calibration is accomplished. Thereby the present invention improves measuring accuracy and speed.

After calibration, since the height of the lower circle, the height of the upper circle, the radius of the upper circle, the radius of the lower circle, and a cone angle of the two circles are all known in advance, the equation for acquiring the height of an upper holding guide contains only one variable, which is the translated distance of the wire in tension from the vertical position to the circle edge. The equation of the height of a lower holding guide also contains one variable similarly estimated as the upper one. The prior art formula for deriving the height of the upper or lower holding guide has two variables. The formula of the present invention has only one variable required to obtain the height of the upper or lower holding guide. Therefore, in the present invention, the heights of the upper holding guide and lower holding guide can be more easily and accurately obtained than the prior art.

The various objects and advantages of the present invention will be more readily understood from the following detailed description when read in conjunction with the appended drawings.

BRIEF DESCRIPTION OF THE DRAWINGS

In the accompanying drawings.

DESCRIPTION OF THE PREFERRED EMBODIMENT

In order that those skilled in the art can further understand the present invention, a description is given the following in detail. However, these descriptions and the appended drawings are only used to enable those skilled in the art to understand the objects, features, and characteristics of the present invention, but not to be used to confine the scope and spirit of the present invention defined in the appended claims.

Figure 1:
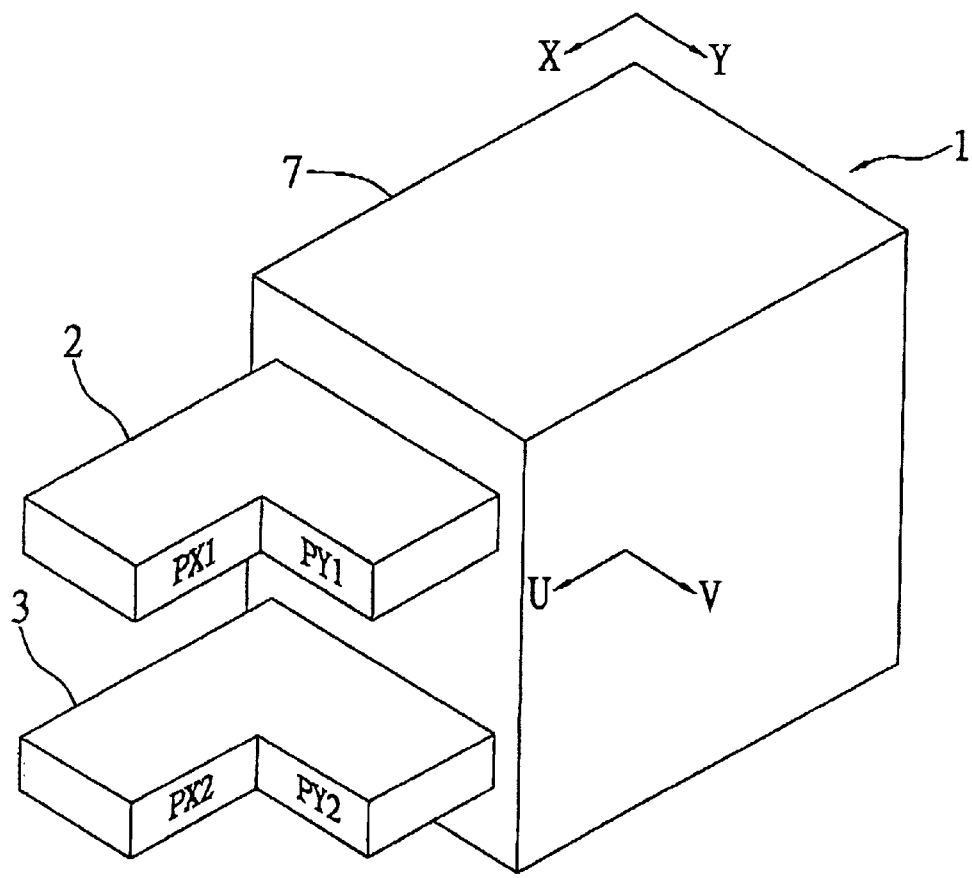
FIG. 1 is a schematic view of a conventional vertical calibration device.
Figure 2:
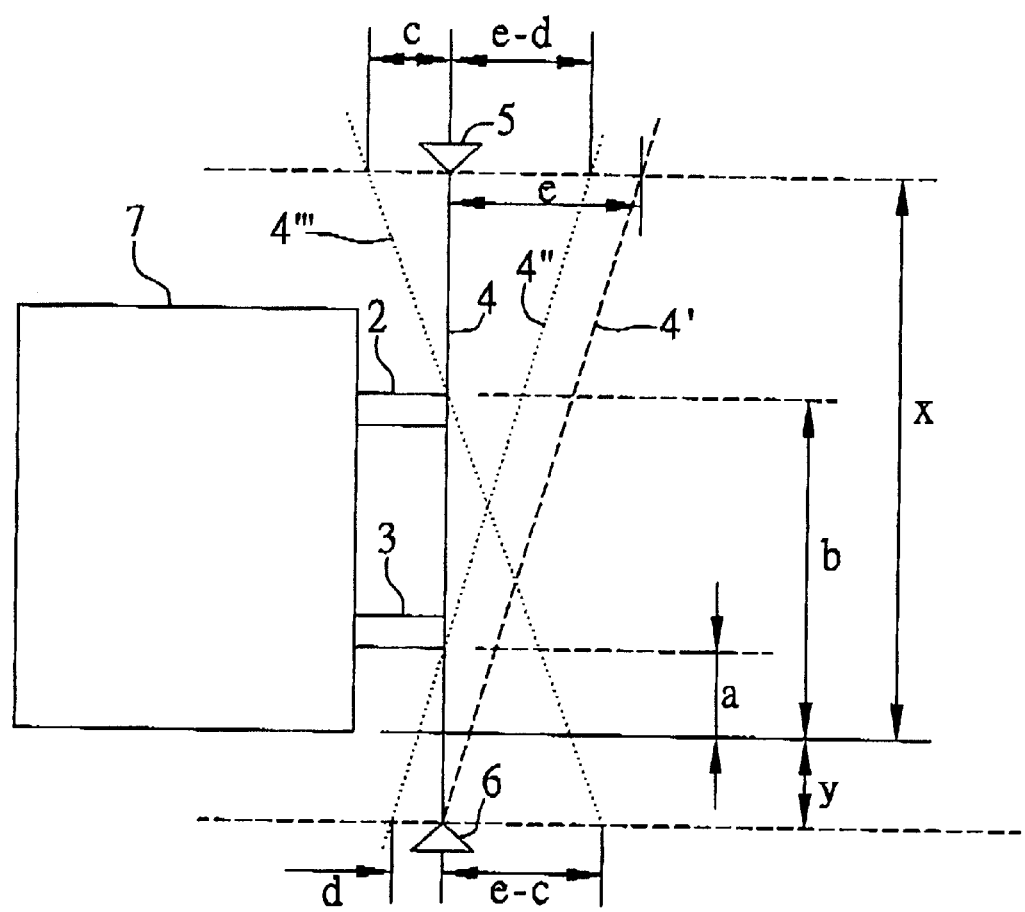
FIG. 2 is used to describe the calculation of heights of an upper holding guide and a lower holding guide in the vertical calibration device of FIG. 1.
Figure 3:
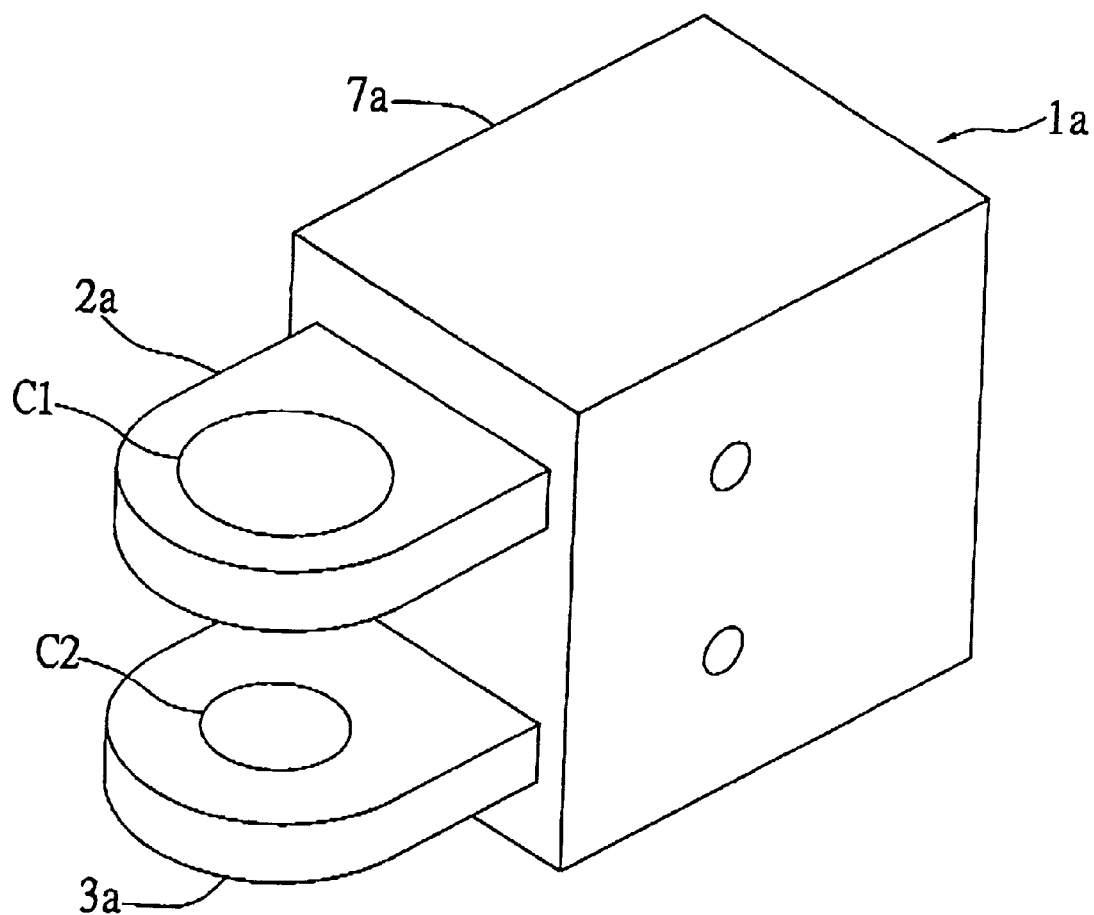
FIG. 3 is a schematic view of an embodiment of the vertical calibration device of the present invention.

Referring to FIG. 3, a vertical calibration device $1a$ embodying the invention includes a main body $7a$, an upper calibration board $2a$ and a lower calibration board $3a$, which are insulated from and fixed to the main body $7a$. The upper calibration board $2a$, the lower calibration board $3a$, and the flat bottom of the main body $7a$ are parallel to a base table (not shown) of the discharging machine. The upper calibration board $2a$ has an upper circle C1, and the lower calibration board $3a$ has a lower circle C2. The upper circle C1 and lower circle C2 are coaxial circles but have different diameters. In this embodiment, the radius of the upper circle C1 is R, and the radius of the lower circle C2 is r, while R>r. The vertical calibration device $1a$ and the controller (not shown) of the discharging machine may cooperate to detect if a wire is in contact with the upper circle C1 or lower circle C2.

Figure 4:
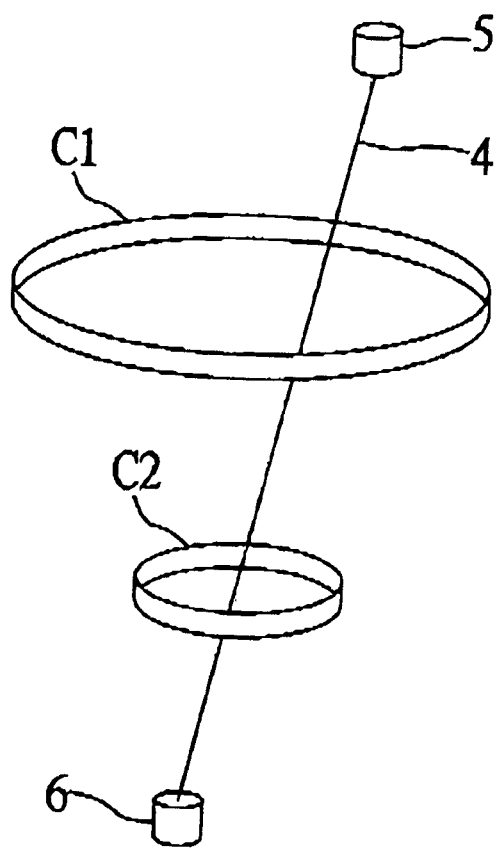
FIG. 4 is a schematic view of an embodiment of the vertical calibration device of the present invention, wherein before calibration, the tilt wire passes through the upper circle and lower circle which are coaxial but have different diameters.

The vertical calibration device $1a$ can be used to perform vertical calibration of a wire and determine positions of an upper holding guide 5 and a lower holding guide 6 (FIG. 4). At first, the vertical calibration device $1a$ is fixed to the table (not shown). The upper calibration board $2a$ and lower calibration board $3a$ are parallel to the base table, while the upper circle C1 and lower circle C2 are within the traveling range of the discharging machine. The machine is adjusted in elevation along a Z axis to be above the vertical calibration device $1a$ so that, as the machine moves, it would not collide with the vertical calibration device $1a$. When the machine moves to a position corresponding to the upper circle C1 and the lower circle C2, a wire 4 passes through the two circles C1 and C2, as illustrated in FIG. 4. The upper holding guide 5 is above the upper circle C1 and the lower holding guide 6 is below the lower circle C2. The wire 4 passing through the upper circle C1 and lower circle C2 is not in contact with the upper circle C1 or lower circle C2, and is held in tension.

Figure 5A:
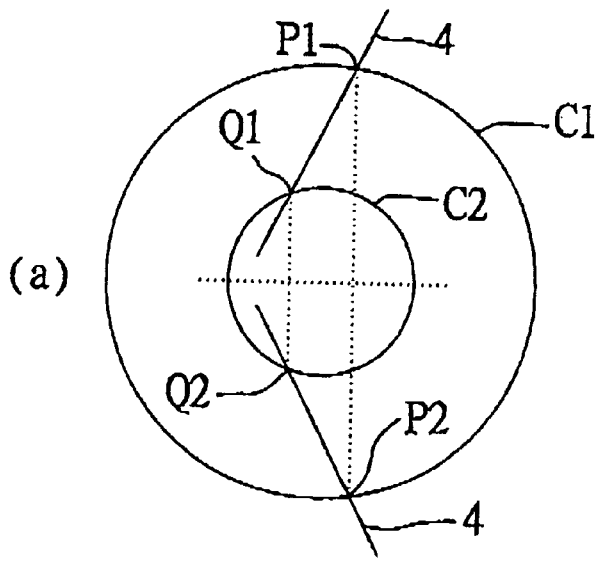
FIG. 5A shows an embodiment of the vertical calibration device in the present invention, wherein in the calibration process, contact points are found in the Y and V directions, where (b) is a perspective view and (a) is an upper view.
Figure 5A:
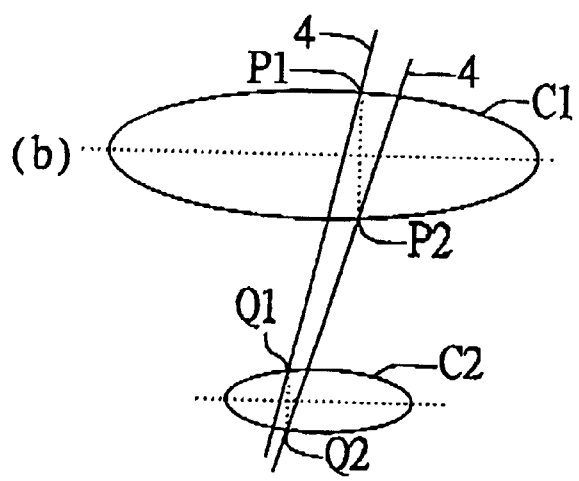
Figure 5B:
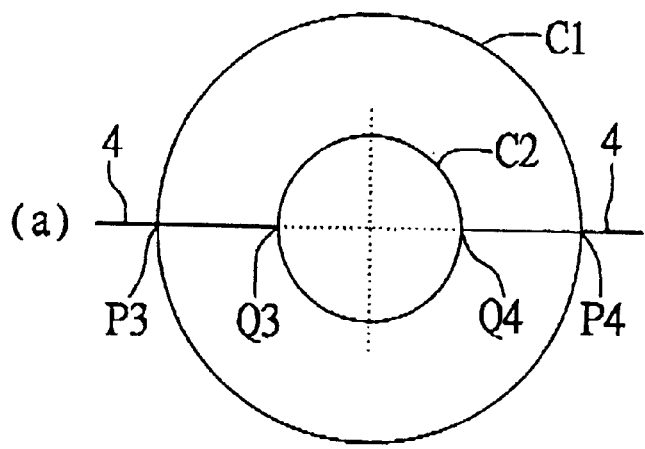
FIG. 5B shows an embodiment of the vertical calibration device in the present invention, wherein in the calibration process, contact points are found in X and U directions, where (b) is a perspective view and (a) is an upper view.
Figure 5B:
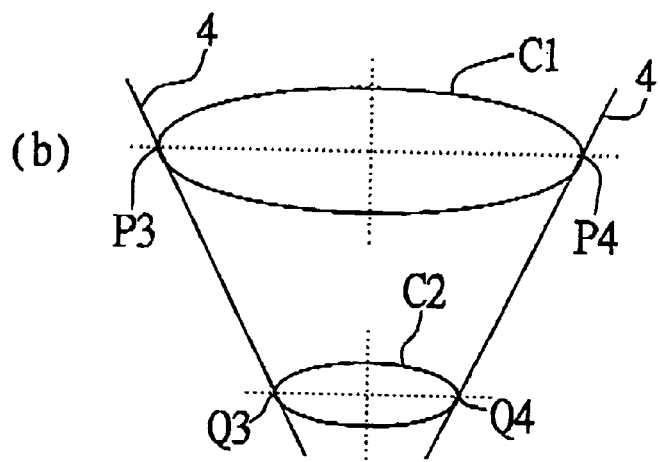

A process of automatic vertical calibration is initiated at first, as shown in FIG. 5A, wherein (b) is a perspective view and (a) is a top view. The machine moves along the directions of the Y axis and V axis to look for points P1 and Q1 which are the contacts points of wire 4 with the upper circle C1 and lower circle C2 respectively, and records the points P1 and Q1. Then, the machine moves in reverse directions along the Y axis and V axis, and the points P2 and Q2 being other contacts points of the wire 4 with the upper circle C1 and lower circle C2 are obtained and recorded. Then, the machine moves to a middle point. Then, as shown in FIG. 5B, where (b) is a perspective view, and (a) is an upper view, the machine moves along the X axis and U axis to look for points P3 and Q3 which are contact points of the wire 4 with the upper circle C1 and lower circle C2, and the points P3 and Q3 are then recorded. Then, the machine moves in reverse directions along the X axis and U axis, points P4 and Q4 being other contact points of the wire 4 with the upper circle C1 and lower circle C2 are obtained and recorded. Then, the machine moves to a middle point. These middle points are on the axis of the coaxial circles C1 and C2, i.e., the vertical position of the wire 4.

Of course, the axis of the coaxial circles C1 and C2 may be obtained from deriving a center of a circle through three points. To improve the precision in the vertical calibration, four points may be used to acquire a center of a circle, or the centers of the circles may be located multiple times to obtain an average.

To shorten the contact time of the wire 4 with the vertical calibration device $1a$ to a minimum so as to reduce damage to the wire 4, the wire can be adapted to be in contact with the upper circle C1 and lower circle C2 at the same time by the following steps (movement of the wire 4 isn a positive direction along an X axis is exemplified):

(1) The wire 4 moves toward the upper circle C1 and lower circle C2 along a positive direction of the X axis and U axis with a predetermined speed until contact with any one of the circles is detected. Then, it is determined and recorded whether the wire is in contact with the upper circle C1 or lower circle C2.

(2) If the lower circle C2 is contacted, then the wire 4 moves away from the lower circle C2 in a negative X direction with a predetermined speed. If the upper circle C1 is contacted, then the wire 4 moves away from the upper circle C1 in a negative direction along the U axis with a predetermined speed until it no longer contacts the circle C1.

(3) If the previous record of contact is the lower circle C2, then the wire 4 moves toward the two circles C1 and C2 along a positive direction of the U axis with a predetermined speed until it is in contact with either one of the two circles C1 and C2; if the previous record of contact is the upper circle C1, then the wire 4 moves toward the two circles C1 and C2 along a positive direction of the X axis with a predetermined speed until it is in contact with either one of the two circles C1 and C2. It is then determined and recorded whether the contacted circle is the upper circle C1 or the lower circle C2.

(4) If the contacted circle is the lower circle C2, the wire 4 moves away from the lower circle C2 along the negative direction of the X axis with a predetermined speed. If the contacted circle is the upper circle C1, the wire 4 moves away from the upper circle C1 along the negative direction of U axis with a predetermined speed until then it is no longer in contact with the circle C1.

(5) Determine if the record of contact in step (3), is the same as the contacted circle in step (4), if so, the process returns to step (3). If not, then the operation of finding the position of a circle is complete.

(6) The step (1) to step (5) are repeated several times (according to the precision required). The moving speed is reduced in each operation. Therefore, the positions where the wire 4 contacts the upper circle C1 and lower circle C2 at the same time can be found.

The above method can be used to detect movement of the wire 4 in the negative direction of the X axis, the positive direction of the Y axis, and the negative direction of the Y axis, so as to find positions where the wire 4 contacts the upper circle C1 and lower circle C2 at the same time. In these steps, the time for contact between the copper wire 4 and the upper circle C1 and lower circle C2 is shortened, and no pressure is applied between the wire and circles, thereby reducing the possibility of wire scraping.

Figure 6:
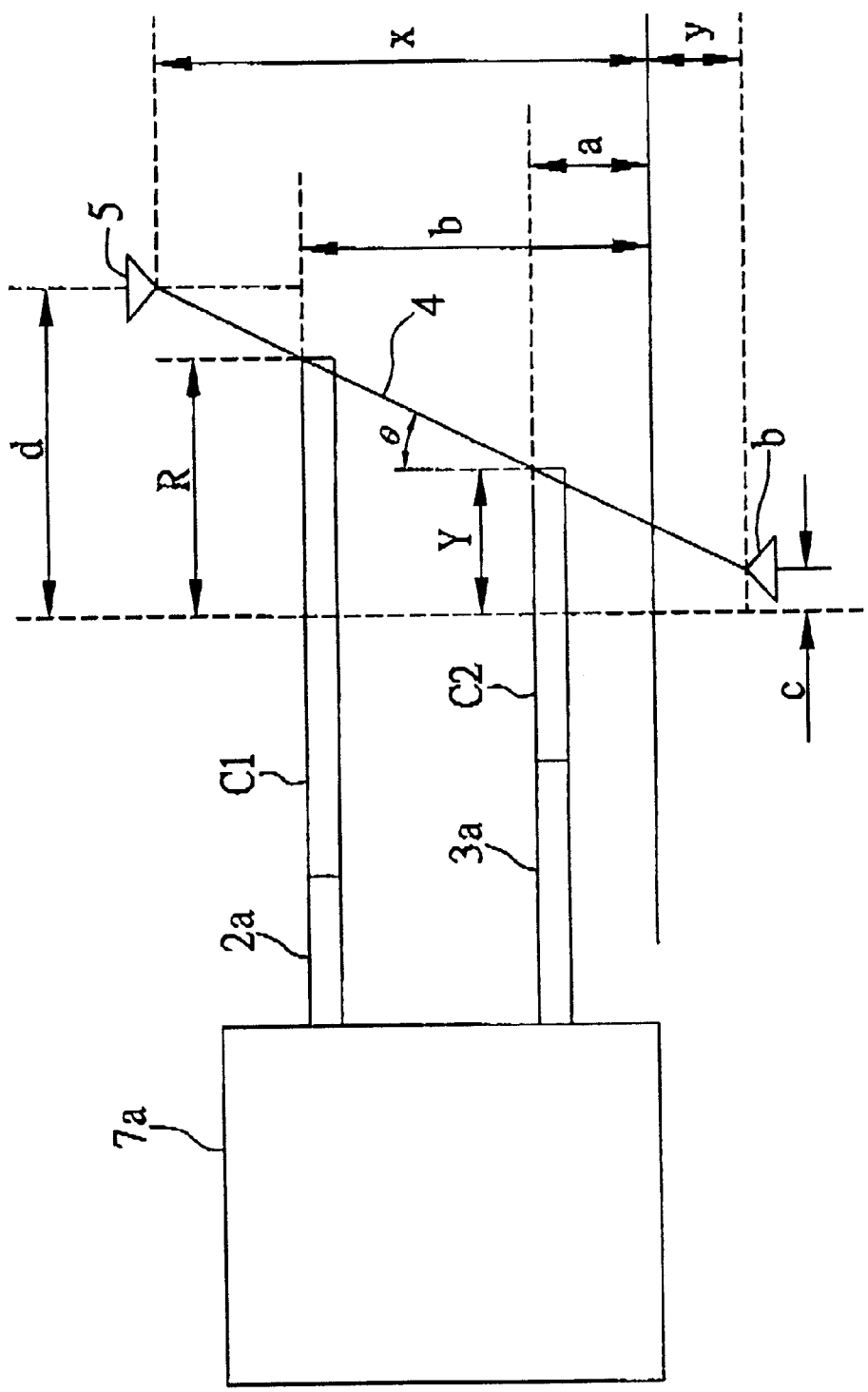
FIG. 6 is a schematic view of an embodiment of the vertical calibration device for the calculation of the heights of the upper holding guide and lower holding guide.

After completing the wire vertical calibration, positions of the upper holding guide and lower holding guide are calculated. With reference to FIG. 6, after calibration, data can be obtained, where a is the height of the lower circle C2, b is the height of the upper circle C1, R is the radius of the upper circle C1, r is the radius of lower circle C2, and θ is half of the cone angle of the two coaxial circles C1 and C2. These are intrinsic data measured by the vertical calibration device 1a of the present invention. The values of c and d can be obtained from movement of the controller of the wire cutting electric discharge machine from the vertical position to the circle edge. Therefore, the heights of the upper holding guide 5 and lower holding guide 6 are calculated by the formulas $$x = b + (d-R)/\tan(\theta) \quad (3)$$

$$y = (r-c)/\tan(\theta) - a \quad (4),$$

wherein x is the height of the upper holding guide 5, and y is the height of the lower holding guide 6.

The formula for acquiring x only contains a variable d. The formula (1) of the prior art for deriving x value has two variables c, d. The above formula (4) has one variable, c, for acquiring the y value. In the formula of the prior art (2), two values c, d are present for deriving the y value. Therefore, in the present invention, the heights x and y of the upper holding guide 5 and lower holding guide 6 can be more easily and precisely obtained.

In the above embodiment, the radius R of the upper circle C1 is larger than the radius r of the lower circle C2, however, in other embodiments, the radius R of the upper circle C1 may be smaller than the radius r of the lower circle C2 or the two circles may have the same radii.

Figure 7:
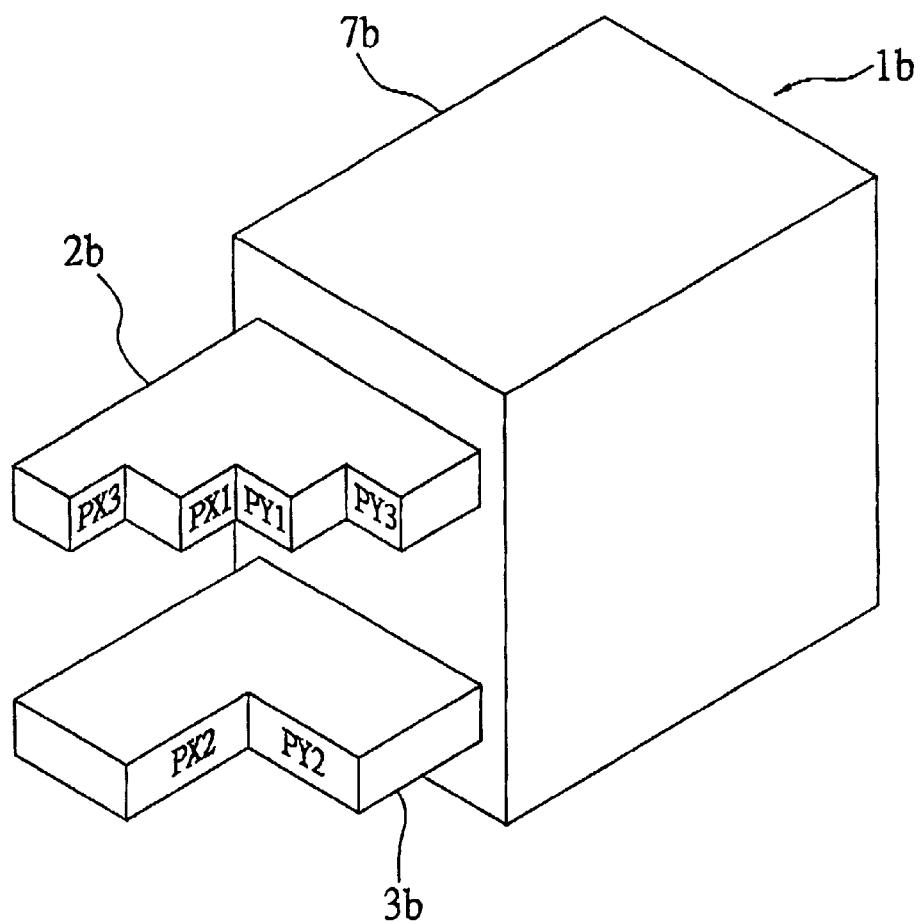
FIG. 7 is a schematic view of another embodiment of the vertical calibration device in the present invention.

In the present invention, the heights of the upper holding guide 5 and lower holding guide 6 are measured by a known tilt angle. However, in the embodiment illustrated in FIG. 7, the main body 7b of the vertical calibration device 1b has an upper calibration board 2b having a surface PX1 thereof which is coplanar with a surface PX2 of the lower calibration board 3b. The surface PY1 of the upper calibration board 2b is on the same plane of the surface PY2 of the lower calibration board 3b. The surface PX1 and surface PX2 are vertical to the PY1 surface and PY2 surface, and these surfaces all are vertical to a base table (not shown). A surface PX3 of the upper calibration board 2b is not coplanar with but is parallel to the surface PX2 of the lower calibration board 3b. A surface PY3 of the upper calibration board 2b is not coplanar with but is parallel to the surface PY2 of the lower calibration board 3b When this vertical calibration device 1b of FIG. 7 is used in vertically calibrating a wire 4 and measuring heights of an upper holding guide 5 and a lower holding guide 6 of a wire cutting electric discharge machine, at first, the surface PX1 and surface PX2 are adapted to be parallel to the X axis of the base table, and the surface PY1 and surface PY2 are adapted to be parallel to the Y axis of the base table. The machine is used to place the (copper) wire 4 in tension. At first, contact points for the wire 4 with the surface PX1 and surface PX2 in the X and U directions are attained, or contact points of the wire 4 with the surface PY1 and surface PY2 in the Y and V directions are attained. Then contact points in the reverse directions are derived to obtain the vertical position of the wire 4. This is identical to the prior art. For measuring the heights of the upper holding guide 5 and lower holding guide 6, the method of the present invention can be used. Since when the wire 4 is in contact with the surface PX3 of the upper calibration board 2b and the surface PX2 of the lower calibration board 3b, the angle between the tilt wire 4 and a vertical line is known, thereby the values of x and y can be obtained by the foregoing formulas (3) and (4). Furthermore, the heights of the upper holding guide 5 and lower holding guide 6 can be measured through the use of the surface PY3 of the upper calibration board 2b and the surface PY2 of the lower calibration board 3b.

In this embodiment, there may be only one of the surfaces PX3 and surface PX2, which can be manufactured on the upper calibration board or lower calibration board.

The method and device for vertically calibrating a wire of a wire cutting electric discharge machine of the present invention use two coaxial circles at the upper and lower side having different radii. Two circles have respective detecting points for inputting data to the controller of the machine. By this circle detecting device, the centers of the upper and lower circles are obtained to acquire a vertical position of the wire. Therefore, the error in calibration is reduced without having to align the device parallel with or vertically to an axial direction as in the prior art. Therefore, the method of the present invention increases the precision and speed in measurement. In the present invention, by the known radii of two circles, the known heights of the two circles with respect to the base table, the known cone angle of the coaxial circles, and the displacement from a vertical position to any contact point, the positions of the upper holding guide and lower holding guide can be respectively acquired by one equation with only one variable is in the equation, which reduces error and increases the measurement precision.

While the present invention is thus described as above, it will be obvious that it may be varied in many ways. Such variations are not to be regarded as a departure from the spirit and scope of the present invention, and all such modifications as would be obvious to one skilled in the art are intended to be included within the scope of the following claims.

We claim:

1. In combination with a wire cutting electric discharge machine having a machine position controller, a wire position calibrating apparatus comprising:

a main body having a flat bottom and a plurality of lateral surfaces, an upper calibration board, having an upper circle extending therethrough, the upper calibration board being fixed to one of the lateral surfaces of the main body so as to be parallel to said bottom, and a lower calibration board, having a lower circle extending therethrough, the lower calibration board being fixed to one of the lateral surfaces of the main body so as to be parallel to said bottom, the upper and lower circles being coaxial and having different diameters, whereby the apparatus may be operated by said controller to detect whether a wire is in contact with the upper circle and the lower circle.

2. The combination of claim 1, wherein the upper calibration board and the lower calibration board are insulated from and connected to the main body.

3. A method for vertically calibrating a wire of a wire cutting electric discharge machine, said method comprising steps of installing a detecting device comprising an upper circle and a lower circle which are parallel to a base, wherein the two circles are coaxial and have different diameters, and each circle has means for detecting when a wire is in contact with it, passing a wire through the upper circle and the lower circle and then placing tension on the wire, so as to prevent the wire from contacting either circle, moving the machine so that the wire contacts each of the circles plural times to locate centers of the circles, and passing the wire through the centers thus determined.

4. The method of claim 3, wherein the moving step comprises steps of moving the machine along a first selected axis to a first contact point where the wire contacts the upper circle or the lower circle, recording the location of the first contact point, moving along said first selected axis in a reverse direction until a second contact point with said circle is reached, moving along said first selected axis to a point midway between said first and second contact point, then moving the machine along a second axis perpendicular to said first axis to a third contact point where the wire contacts said circle, recording the location of the third contact point, then moving the machine along said second axis in a reverse direction until a fourth contact point is reached, moving the machine along said first perpendicular axis to a point midway between said third and fourth contact points, said midway point being the center of the circle.

5. The method of claim 3, wherein the moving step comprises steps of moving the wire toward the upper circle and lower circle in a positive direction along a selected first axis at a predetermined speed until contact with either circle is detected, determining which circle is contacted, and recording die result, moving the wire away from the contacted circle in a negative direction along said selected first axis at a predetermined speed until the wire is out of contact with said contacted circle, moving the wire near the two circles in a positive direction along said perpendicular axis at a predetermined speed until it contacts one of the circles, determining which circle has been contacted and recording the result, moving the wire in negative direction along said perpendicular axis at a predetermined speed until it is out of contact with said contacted circle, repeating the preceding steps several times to find positions where the wire contacts the upper circle and the lower circle at the same time.

6. The method of claim 5, wherein the height x of the upper holding guide and the height y of the lower holding guide are expressed by the equation system $$x = b + (d-R)/\tan(\theta)$$

$$y = r - c/\tan(\theta) - a$$

where b is a height of the upper circle, a is a height of the lower circle,

R is a radius of the upper circle, r is the radius of the lower circle, and

θ is one-half the cone angle of the two circles, c is a distance moved by the lower holding guide from the vertical position to any original position in finding the edge during the step of moving in a reverse direction, and d is a distance moved by the upper holding guide from the vertical position to any original position in finding the edge during the step of moving in a reverse direction.

7. In combination with a wire cutting electric discharge machine having a machine position controller, a wire position calibrating apparatus comprising:

a main body having a flat bottom and a plurality of lateral surfaces, a first calibration board fixed to one lateral surface of the main body and parallel to the bottom of the main body, the first calibration board having a first surface and a second surface, each perpendicular to the bottom of the main body, the first surface being perpendicular to the second surface, and a second calibration board fixed to one lateral surface of the main body and parallel to the bottom of the main body, the second calibration board having a third surface and a fourth surface, each perpendicular to the bottom of the main body, the third surface being coplanar with the first surface for allowing the wire to contact the first surface and the third surface, the fourth surface being coplanar with the second surface to allow the wire to contact the second surface and the fourth surface, the second calibration board having a fifth surface which is parallel to, but not coplanar with the first surface, and the wire being in contact with the first surface and the fifth surface, wherein the machine controller may be operated to detect when the wire is in contact with said surfaces of said calibration boards.

8. The combination of claim 7, wherein the second calibration board has a sixth surface parallel to but not coplanar with the second surface, and the wire can contact the second surface and the sixth surface.

9. The combination of claim 7, wherein both said calibration boards are insulated from and connected to the main body.

* * * * *